(12) United States Patent
Motowaki

(10) Patent No.: US 11,285,620 B2
(45) Date of Patent: Mar. 29, 2022

(54) HAND APPARATUS

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 226 days.

(21) Appl. No.: 16/835,380

(22) Filed: Mar. 31, 2020

(65) Prior Publication Data

US 2020/0338752 A1    Oct. 29, 2020

(30) Foreign Application Priority Data

Apr. 26, 2019   (JP) .............................. JP2019-085883

(51) Int. Cl.
   *B25J 15/02*       (2006.01)
   *B25J 15/00*       (2006.01)
(52) U.S. Cl.
   CPC ....... *B25J 15/0253* (2013.01); *B25J 15/0033* (2013.01)
(58) Field of Classification Search
   CPC .......................... B25J 15/0033; B25J 15/0253
   USPC ....................................................... 294/207
   See application file for complete search history.

(56) References Cited

U.S. PATENT DOCUMENTS 8,602,473 B2 * 12/2013 Weber .................. B25J 15/0266
                                                              294/207
2006/0182603 A1 * 8/2006 Hawes ................... B65G 47/90
                                                              414/735

FOREIGN PATENT DOCUMENTS

JP          H01143225 A      6/1989

* cited by examiner

*Primary Examiner* — Saul Rodriguez
*Assistant Examiner* — Brendan P Tighe
(74) *Attorney, Agent, or Firm* — Studebaker & Brackett PC

(57) ABSTRACT

The hand apparatus includes: a grasper that grasps a work; a grasper driving portion that causes the grasper to operate at a first position at which the grasper grasps the work, a second position at which the grasper is open widest, and a third position between the first position and the second position; a hand mechanism portion having a pair of hand portions that holds both ends in a width direction of the work grasped by the grasper and capable of varying an opening position of the pair of hand portions; an operating portion provided so as to be interlocked with an operation of the grasper and being connectable to the hand mechanism portion; and an actuator that causes the grasper to advance and retract, wherein when the grasper is at the second position, the hand mechanism portion is connected to the operating portion to vary the opening position of the pair of hand portions by being interlocked with the advancing and retracting movement of the grasper according to the actuator, and when the grasper is at the first position or the third position, the hand mechanism portion is disconnected from the operating portion to fix the opening position of the pair of hand portions.

5 Claims, 15 Drawing Sheets

HAND APPARATUS

This application is based on and claims the benefit of priority from Japanese Patent Application No. 2019-08588, filed on 26 Apr. 2019, the content of which is incorporated herein by reference.

BACKGROUND OF THE INVENTION

Field of the Invention

The present invention relates a hand apparatus.

Related Art

Conventionally, a lead frame supply apparatus for supplying lead frames of semiconductors to a conveying frame, in which a chuck for grasping a lead frame can be replaced so as to deal with lead frames having different dimensions is known. (for example, see Patent Document 1).

Patent Document 1: Japanese Unexamined Patent Application, Publication No. H1-143225

SUMMARY OF THE INVENTION

In a hand apparatus that holds both ends of a work using a hand portion, replacing a hand portion according to the dimensions of a work in order to hold works having different dimensions leads to an increase in takt time due to the replacement of a hand portion. Moreover, since it is necessary to prepare various types of hand portions for replacement, a place for hand portions to be used as replacements is required and a production cost for the various types of hand portions incurs. Therefore, in a hand apparatus that holds both ends of a work using a hand portion, it is desirable that it there is no necessity to prepare a plurality of hand portions and that both ends of works having different dimensions can be held.

An aspect of a hand apparatus of the present disclosure includes: a grasper that grasps a work; a grasper driving portion that causes the grasper to operate at a first position at which the grasper grasps the work, a second position at which the grasper is open widest, and a third position between the first position and the second position; a hand mechanism portion having a pair of hand portions that holds both ends in a width direction of the work grasped by the grasper and capable of varying the opening position of the pair of hand portions; an operating portion provided so as to be interlocked with the operation of the grasper and being connectable to the hand mechanism portion; and an actuator that causes the grasper to advance and retract, wherein when the grasper is at the second position, the hand mechanism portion is connected to the operating portion to vary the opening position of the pair of hand portions by being interlocked with the advancing and retracting movement of the grasper according to the actuator, and when the grasper is at the first position or the third position, the hand mechanism portion is disconnected from the operating portion to fix the opening position of the pair of hand portions.

According to the hand apparatus of one aspect, it is not necessary to prepare a plurality of hand portions and it is possible to hold both ends of works having different sizes.

DETAILED DESCRIPTION OF THE INVENTION

Figure 1:
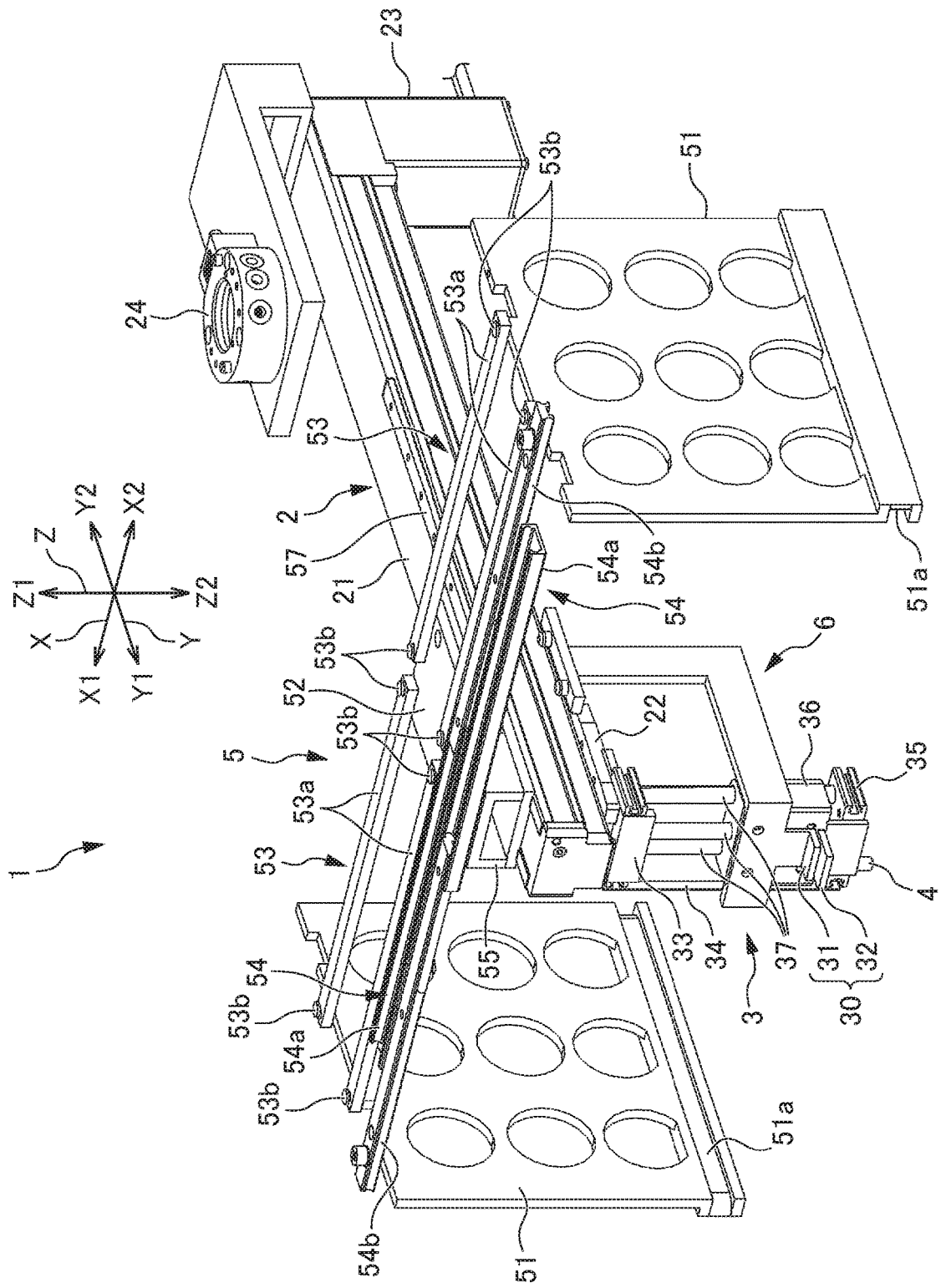
FIG. 1 is a perspective view when an embodiment of a hand apparatus is seen from an upper side.
Figure 2:
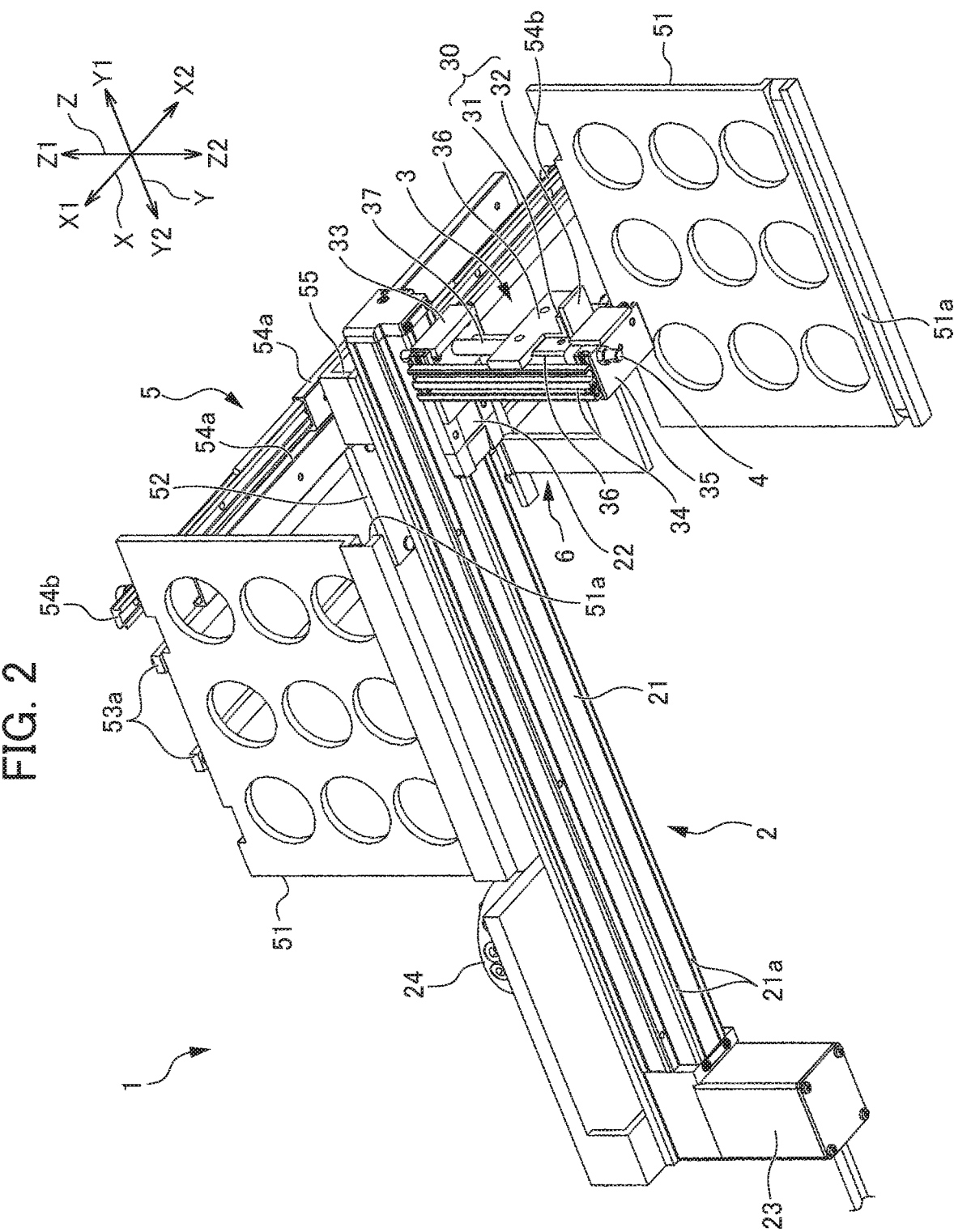
FIG. 2 is a perspective view when an embodiment of a hand apparatus is seen from a lower side.
Figure 3:
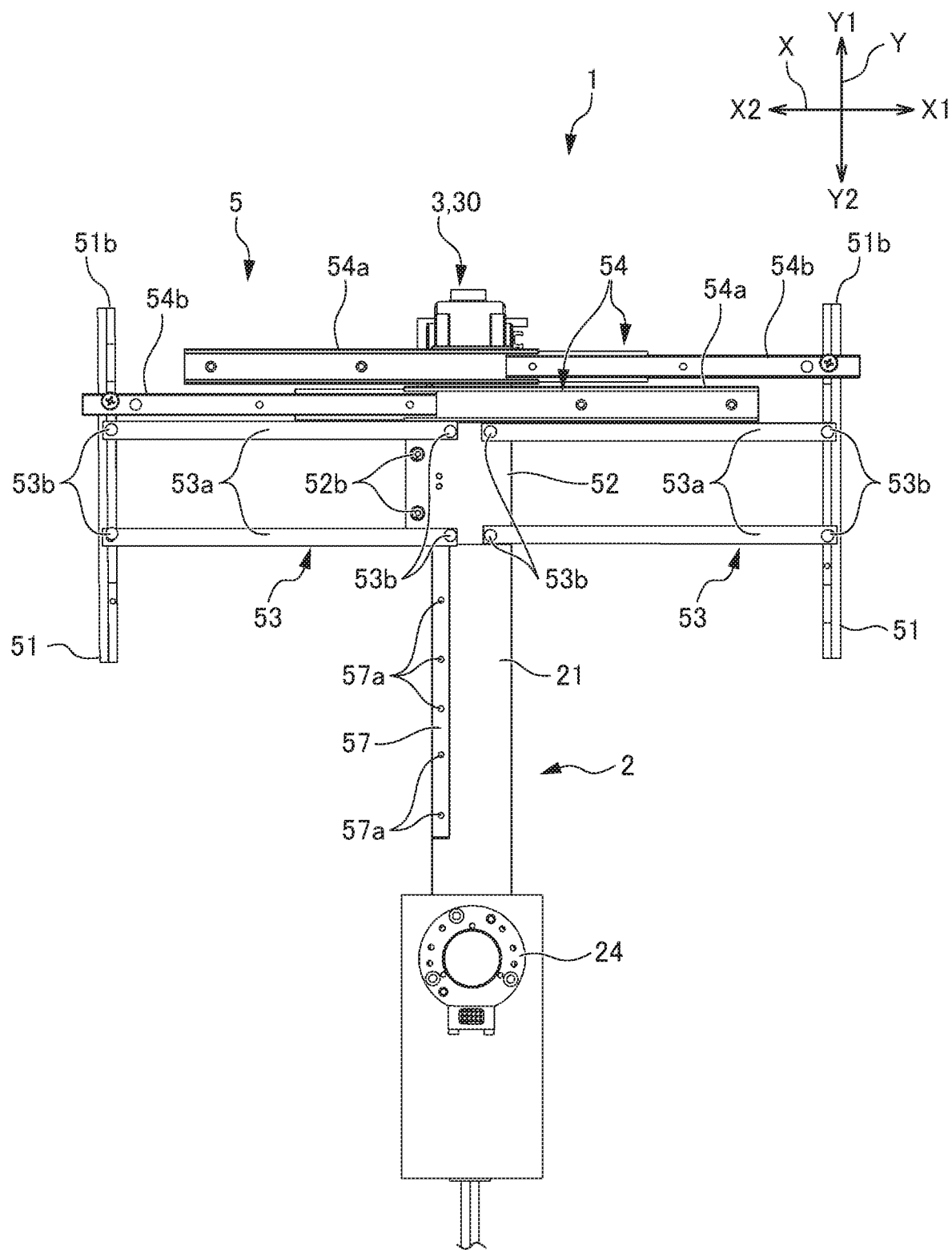
FIG. 3 is a plan view of an embodiment of a hand apparatus.
Figure 4:
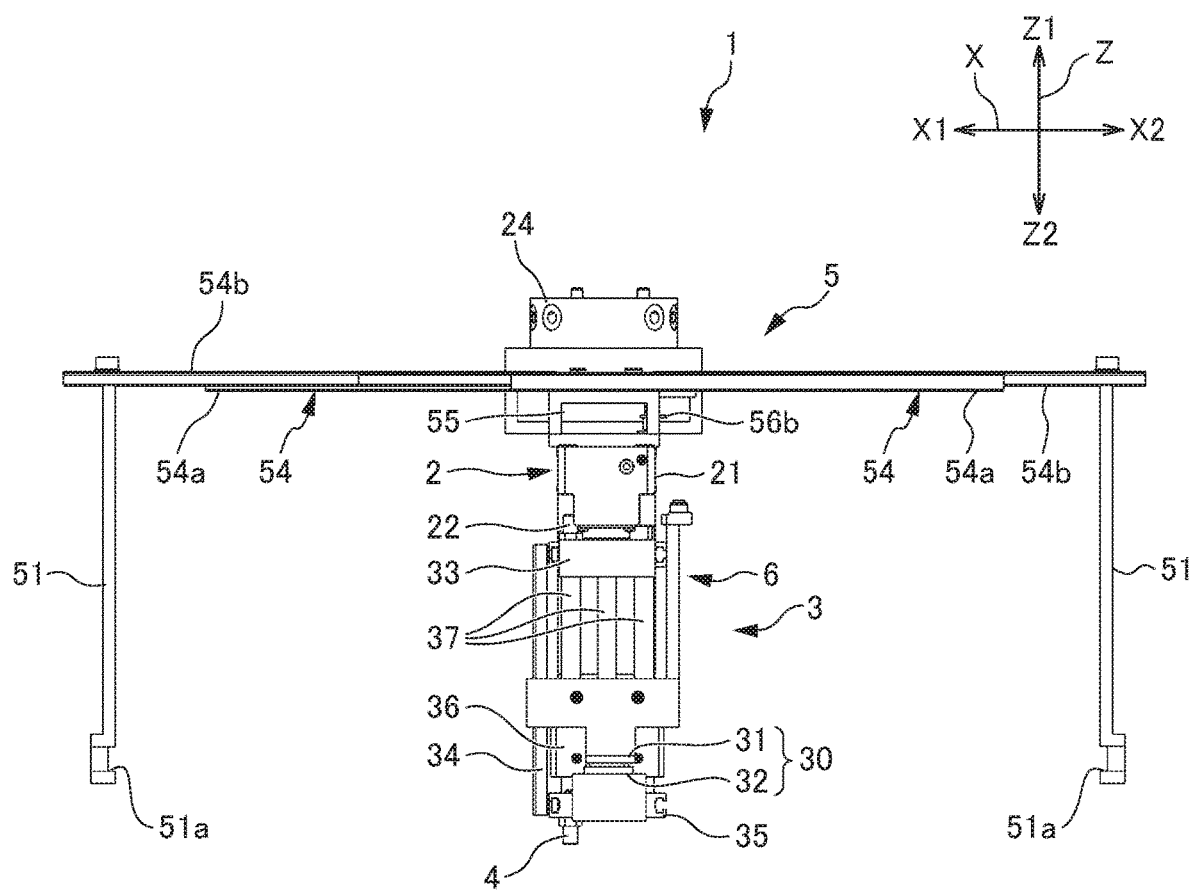
FIG. 4 is a front view of an embodiment of a hand apparatus.
Figure 5:
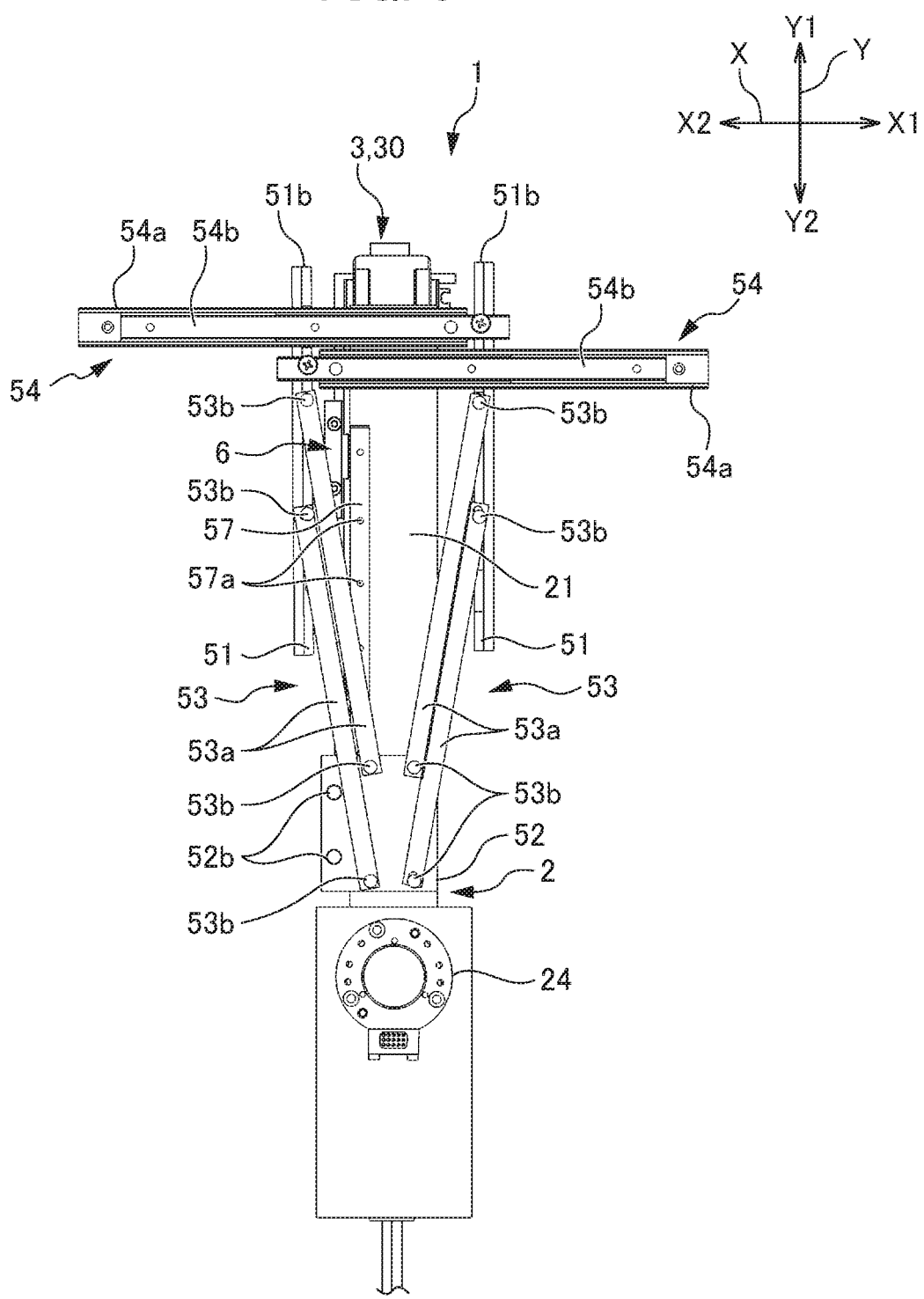
FIG. 5 is a plan view of an embodiment of a hand apparatus illustrating a minimum opening position of a hand portion.
Figure 6:
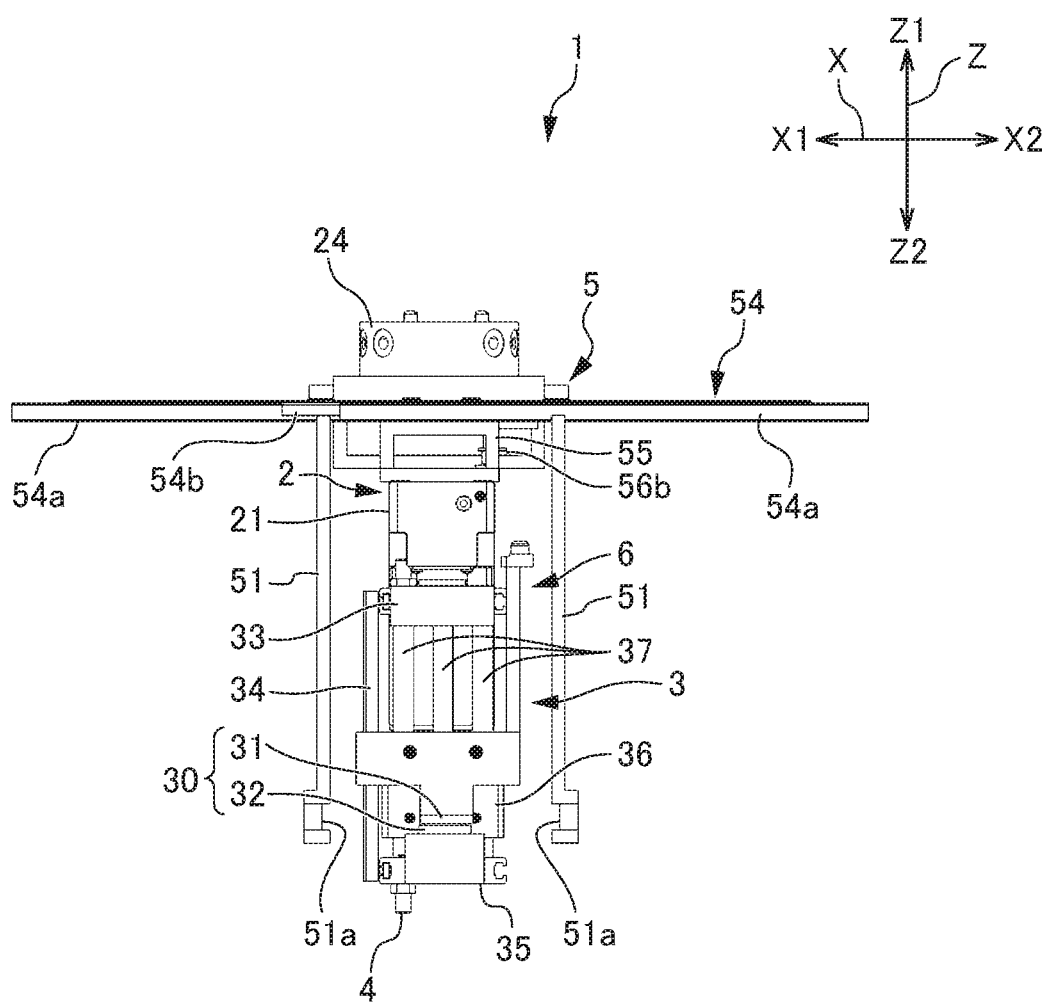
FIG. 6 is a front view of an embodiment of a hand apparatus illustrating a minimum opening position of a hand portion.

Hereinafter, an embodiment of a hand according to the present disclosure will be described in detail with reference to the drawings. FIG. 1 is a perspective view when an embodiment of a hand apparatus is seen from an upper side. FIG. 2 is a perspective view when an embodiment of a hand apparatus is seen from a lower side. FIG. 3 is a plan view of an embodiment of a hand apparatus. FIG. 4 is a front view of an embodiment of a hand apparatus. FIG. 5 is a plan view of an embodiment of a hand apparatus illustrating a minimum opening position of a hand portion. FIG. 6 is a front view of an embodiment of a hand apparatus illustrating a minimum opening position of a hand portion.

A hand apparatus 1 of the present embodiment is an apparatus which is attached to an arm 200 (see FIGS. 14 and 15) of a robot to convey a planar work (see FIGS. 14 and 15) such as a printed board or a glass plate with the operation of the arm. 200 of a robot in a state in which both ends of the work is held. The hand apparatus 1 includes an actuator 2, a grasper 3, a grasper driving portion 4, and a hand mechanism portion 5.

In the drawings, an X-direction indicates a width direction of the hand apparatus 1. An X1-direction and an X2-direction indicate the opposing directions of the width direction of the hand apparatus 1. A Y-direction indicates a front-rear direction of the hand apparatus 1. An Y1-direction indicates a frontward direction of the hand apparatus 1 and an Y2-direction indicates a rearward direction of the hand apparatus 1. A Z-direction indicates an up-down direction of the hand apparatus 1. A Z1-direction indicates an upward direction of the hand apparatus 1 and a Z2-direction indicates a downward direction of the hand apparatus 1.

The actuator 2 is an electric actuator including an actuator body 21 that is long in the front-rear direction, a moving body 22 disposed under the actuator body 21, and a motor 23 disposed at a rear end of the actuator body 21 to drive the moving body 22. The moving body 22 is connected to the motor 23 via a power transmission mechanism. (not illustrated) such as a ball screw and a chain provided inside the actuator body 21. A guide hole 21a extending in a lengthwise direction of the actuator body 21 is provided in a lower surface of the actuator body 21. The moving body 22 is provided to be capable of advancing and retracting in the front-rear direction along the guide hole 21a according to driving of the motor 23. An automatic tool changer (ATC) 24 for connecting to the arm 200 (see FIGS. 14 and 15) of the robot is provided above the rear end of the actuator body 21.

The grasper 3 includes a grasping claw 30 made up of a movable claw 31 and a fixed claw 32 and grasps an end of a work in a thickness direction of the work using the movable claw 31 and the fixed claw 32. The grasper 3 further includes an upper supporting member 33, a frame member 34, a lower supporting member 35, and a movable member 36. The upper supporting member 33 is fixed to a lower surface of the moving body 22. The frame member 34 is fixed to one side surface of the upper supporting member 33 and extends downward from the upper supporting member 33. The lower supporting member 35 is disposed immediately below the upper supporting member 33. A lower end of the frame member 34 is fixed to one side surface of the lower supporting member 35. In this way, the lower supporting member 35 is disposed at a fixed distance corresponding to the length from the upper supporting member 33 to the frame member 34. The fixed claw 32 is provided in the lower supporting member 35 so as to protrude toward the front side of the hand apparatus 1.

The movable member 36 is disposed between the upper supporting member 33 and the lower supporting member 35. The movable member 36 is provided so as to be movable up and down between the upper supporting member 33 and the lower supporting member 35 along a plurality of (in the present embodiment, three) guide shafts 37 provided over the upper supporting member 33 and the lower supporting member 35. The movable claw 31 is provided in the movable member 36 so as to protrude toward the front side of the hand apparatus 1.

As illustrated in FIGS. 1, 2, and 4, when the movable member 36 is moved downward so as to approach closest to or make contact with the lower supporting member 35, the movable claw 31 is disposed so as to approach or overlap the fixed claw 32 provided in the lower supporting member 35. In this case, the position at which the movable claw 31 and the fixed claw 32 are disposed is a first position at which the grasper 3 grasps a work. The grasper 3 is configured so as to be capable of advancing and retracting in the front-rear direction along the lengthwise direction of the actuator 2 with the driving of the actuator 2 since the upper supporting member 33 is fixed to the moving body 22. Due to this, the grasper 3 can pull or push the work in the front-rear direction of the hand apparatus 1 by advancing and retracting along the front-rear direction of the actuator 2 in a state of grasping the work.

The grasper driving portion 4 is configured as a hydraulic cylinder or a pneumatic cylinder, for example, and is provided in the lower supporting member 35 of the grasper 3. The grasper driving portion 4 can move and stop the movable member 36 at an arbitrary position between the upper supporting member 33 and the lower supporting member 35. Specifically, the grasper driving portion 4 moves the movable member 36 so that the grasper 3 can be disposed at least at three positions of a first position, a second position, and a third position. The first position is a position at which the movable claw 31 and the fixed claw 32 of the grasping claw 30 approach closest or make contact with each other and the grasper 3 grasps the work (see FIGS. 1, 2, and 4) as described above. The second position is a position at which the movable claw 31 and the fixed claw 32 are separated farthest from each other and the grasper 3 is open widest (see FIG. 10). The third position is a position between the first position and the second position (see FIG. 12).

The grasper driving portion 4 can be configured as a three-position cylinder that operates the grasper 3 so as to be disposed at the first, second, and third positions. In this way, it is possible to easily perform positioning of the movable member 36 in the up-down direction so that the grasper 3 is disposed at any one of the first, second, and third positions. Due to this, it is not necessary to incorporate a complex mechanism for realizing positioning of the movable member 36 into the grasper 3 and it is possible to simplify and lighten the grasper 3. The first, second, and third positions will be described in detail later.

The hand mechanism portion 5 includes a pair of hand portions 51 for holding both ends in the width direction of a work, one opening position adjustment portion 52 for adjusting the opening position of the hand portions 51 corresponding to the width dimension of the work, a link portion 53 for connecting the hand portions 51 and the opening position adjustment portion 52, and two slide rails 54 that guide the movement of the hand portions 51.

The hand portions 51 are formed in a planar form and are disposed in parallel with a front-side portion of the actuator 2 sandwiched therebetween. Work holding portions 51a are provided at lower ends of the hand portions 51. The work holding portions 51a are portions that hold both ends in the width direction of the work grasped by the grasping claw 30, and are provided so as to face inward substantially at the same height as the fixed claw 32 in the up-down direction of the hand apparatus 1 as illustrated in FIG. 4. In the present embodiment, the work holding portions 51a are formed as grooves extending along the lengthwise direction (the Y-direction in the drawing) of the hand portion 51. However, specific configuration of the work holding portions 51a is not limited to a groove, but the work holding portions 51a may be configured so as to be able to hold both ends in the width direction of the work between the hand portions 51. Due to this, the work holding portions 51a may be configured as a claw member or a plate member (not illustrated) facing inward to such an extent as to support the lower surfaces of both ends in the width direction of the work, for example. As illustrated in FIGS. 3 and 5, the grasping claw 30 made up of the movable claw 31 and the fixed claw 32 protrudes toward the front side further than the front ends 51b of the hand portions 51 when the grasper 3 is moved frontward to an extreme extent.

The opening position adjustment portion 52 moves in the direction along the advancing and retracting directions of the grasper 3 to vary the opening position or the hand portions 51. The opening position adjustment portion 52 of the present embodiment is formed in a rectangular plate form and is disposed above the upper surface of the actuator body 21 with a small spacing. The opening position adjustment portion 52 is connected to the hand portions 51 by two supporting rods 53a disposed in parallel. Both ends of each of the supporting rods 53a are rotatably attached to the upper ends of the hand portions 51 and the upper surface of the opening position adjustment portion 52 by rotary pins 53b. The link portion 53 is made up of the supporting rod 53a and the rotary pin 53b.

The slide rails 54 are configured to smoothly guide an operation of varying the opening position of the hand portions 51 and are provided in the hand portions 51 in one-to-one correspondence. The slide rails 54 include rail portions 54a and sliders 54b fitted in the rail portion 54a so as to be able to slide, and are provided over the hand portions 51 and the actuator body 21. One set of ends of the rail portions 54a are fixed to the pedestal portion 55 attached to the upper surface of the front end of the actuator body 21 whereby the ends are disposed above the upper surface of the actuator body 21 with a small spacing. The other set of ends of the rail portions 54a extend linearly in both lateral directions (the X1-direction and the X2-direction) of the actuator 2 toward the hand portions 51. One set of ends of the sliders 54b are fixed to the upper ends of the hand portions 51. The fixing positions of the sliders 54b, which are fixed to the upper ends of the hand portions 51, are disposed closer to the front side than the attachment portions of the supporting rods 53a. The other ends of the sliders 54b are inserted into the rail portions 54a.

In FIGS. 1 to 4, the opening position adjustment portion 52 of the hand mechanism portion 5 is disposed on the front side of the actuator body 21 and approaches closest to the rear side of the pedestal portion 55. In this case, the supporting rods 53a of the link portion 53 are disposed so as to be open from the opening position adjustment portion 52 toward both lateral sides so as to be almost orthogonal to the actuator body 21. In this way, the sliders 54b slide in a direction of being removed from the rail portions 54a and the hand portions 51 are disposed at the maximum opening position at which the hand portions 51 are separated farthest from each other.

On the other hand, in FIGS. 5 and 6, the opening position adjustment portion 52 of the hand mechanism portion 5 is disposed on the rear side of the actuator body 21 and approaches closest to the front side of the ATC 24. In this case, the supporting rods 53a of the link portion 53 rotate about the rotary pin 53b and are disposed so as to close along the lengthwise direction of the actuator body 21. In this way, the sliders 54b slide in a direction of being inserted into the rail portions 54a, and the hand portions 51 are mutually disposed at the minimum opening position at which the hand portions 51 approach closest to each other.

In the present embodiment, the opening position of the hand portions 51 can be adjusted in a plurality of steps between the maximum opening position and the minimum opening position by moving the opening position adjustment portion 52 of the hand mechanism portion 5 in a direction along the advancing and retracting directions of the grasper 3. The opening position adjustment portion 52 is fixed at an adjusted position in the front-rear direction of the actuator body 21 and is configured to fix the opening position of the hand portions 51. The moving direction of the opening position adjustment portion 52 is generally the same direction as the advancing and retracting directions of the grasper 3. However, the moving direction of the opening position adjustment portion 52 may be slightly inclined towards to the advancing and retracting directions of the grasper 3 as long as the moving direction is a direction along the front-rear direction of the actuator body 21 and no problem occurs in the operation of the link portion 53 and the opening operation of the hand Portions 51.

Figure 7:
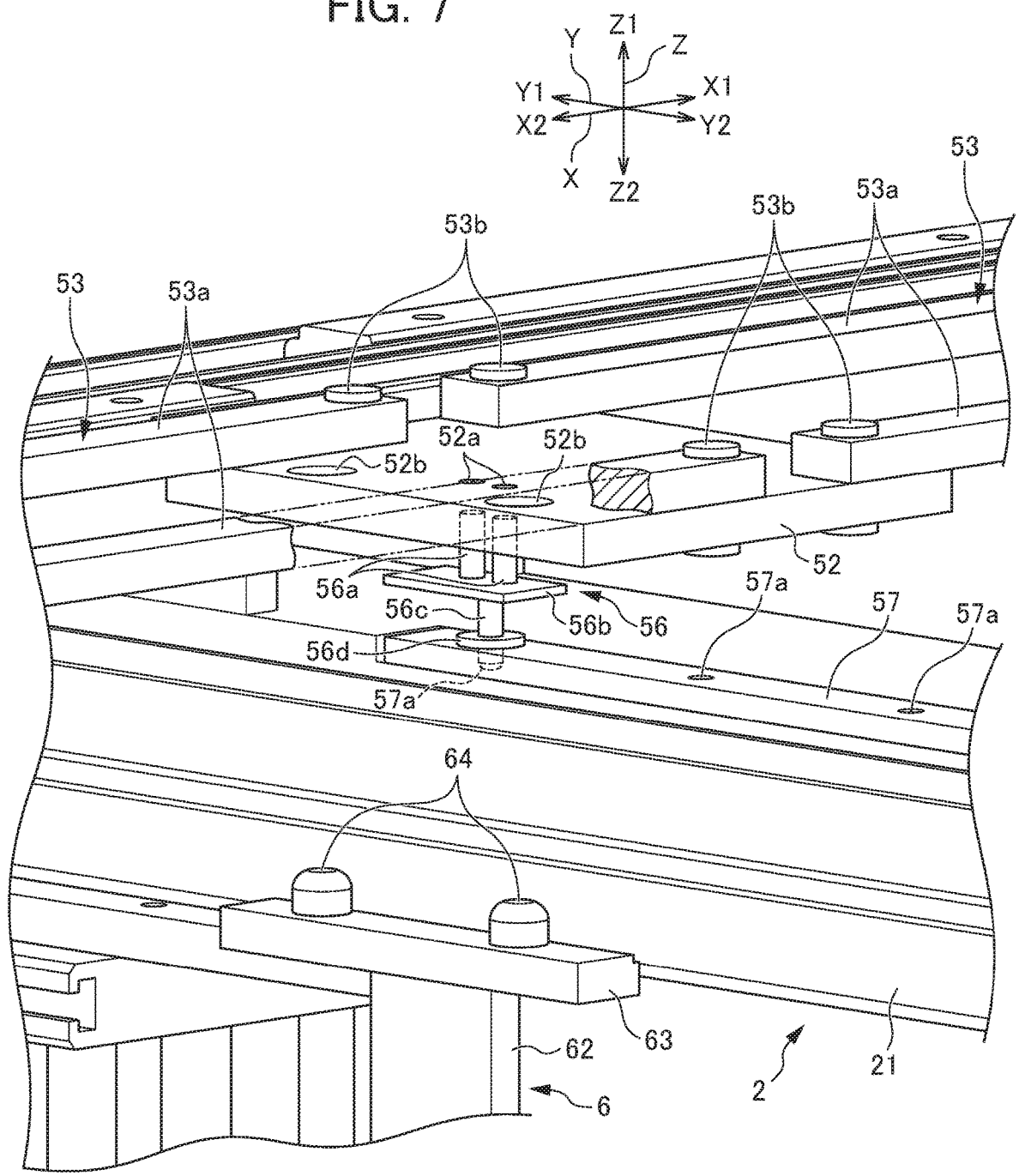
FIG. 7 is a perspective view illustrating a portion of a hand apparatus when a hand portion is disposed at a maximum opening position in an enlarged scale.
Figure 8:
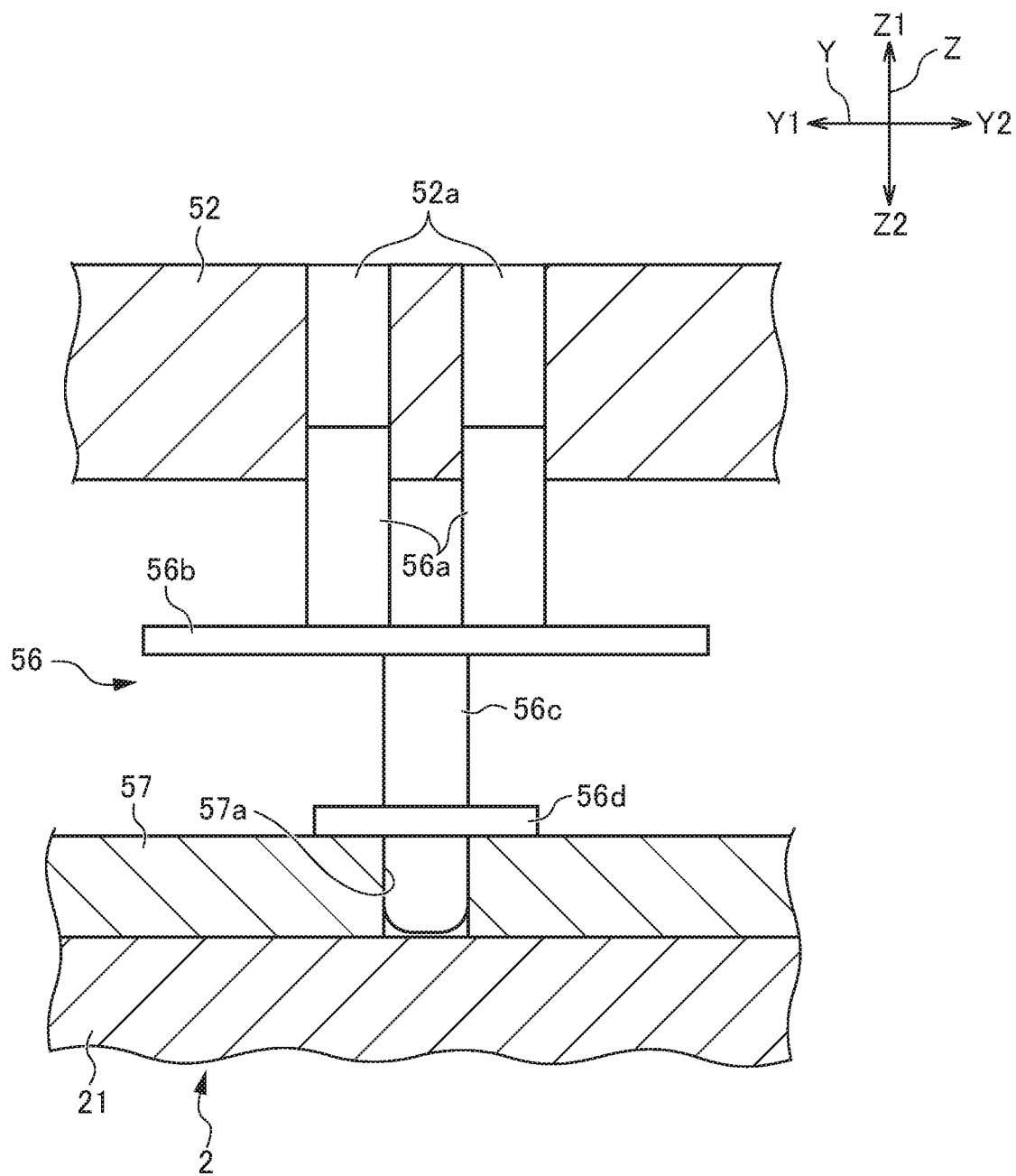
FIG. 8 is a cross-sectional view illustrating an opening position fixing pin for fixing an opening position adjustment portion in an enlarged scale.
Figure 9:
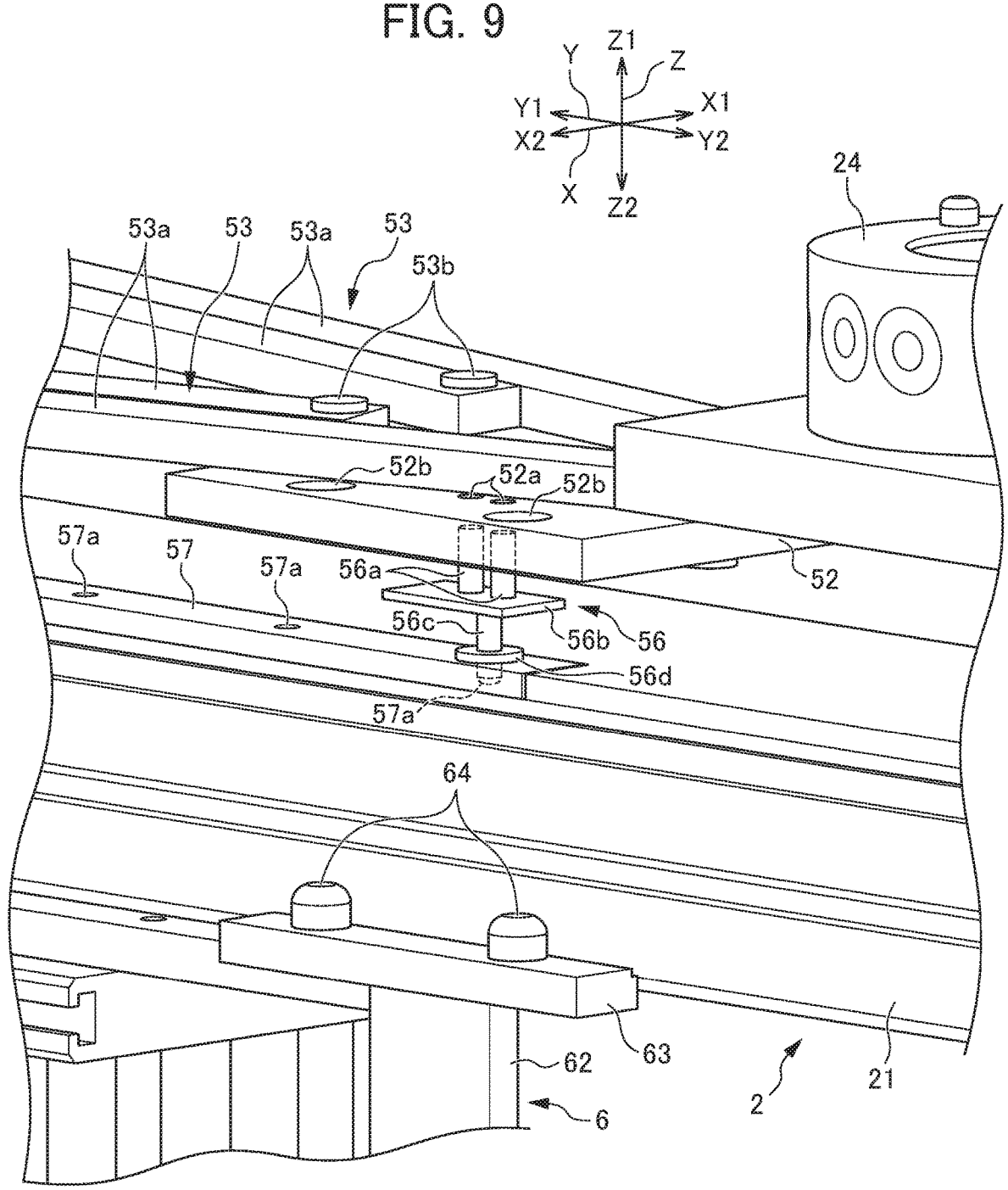
FIG. 9 is a perspective view illustrating a portion of a hand apparatus when a hand portion is disposed at a minimum opening position in an enlarged scale.

Next, a configuration for fixing the opening position of the hand portions 51 will be described in detail with reference to FIGS. 7 to 9. FIG. 7 is a perspective view illustrating a portion of a hand apparatus when a hand portion is disposed at a maximum opening position in an enlarged scale. FIG. 8 is a cross-sectional view illustrating an opening position fixing pin for fixing an opening position adjustment portion in an enlarged scale. FIG. 9 is a perspective view illustrating a portion of a hand apparatus when a hand portion is disposed at a minimum opening position in an enlarged scale. As illustrated in FIGS. 7 to 9, the opening position adjustment portion 52 has an opening position fixing pin 56. The opening position fixing pin 56 of the present embodiment includes a pin base 56a, a pin operating plate 56b, and a pin tip 56c.

The opening position fixing pin 56 has a pair of pin bases 56a disposed in parallel. The opening position fixing pin 56 is attached to the opening position adjustment portion 52 when the pair of pin bases 56a are inserted into a pair of pin attachment holes 52a formed in the opening position adjustment portion 52 in the up-down direction. The pin base 56a and the pin attachment holes 52a are disposed in parallel along the front-rear direction of the actuator body 21 near one end (near the end in the X2-direction) in a width direction of the opening position adjustment portion 52. The pin bases 56a are loosely inserted into the pin attachment holes 52a. Therefore the opening position fixing pin 56 can advance downward from the opening position adjustment portion 52 and retract therefrom.

The pin bases 56a stand on the upper surface of the pin operating plate 56b formed of one flat plate. Only one pin tip 56c protrudes downward (toward the upper surface of the actuator body 21) from the lower surface of the pin operating plate 56b. The flange portion 56d is provided near the lower end of the pin tip 56c.

A hole member 57 is attached to a lateral portion (a lateral portion in the X2-direction in the drawing) of the upper surface of the actuator body 21 corresponding to the lower side of the opening position fixing pin 56. The hole member 57 has a length corresponding to the movable range of the opening position adjustment portion 52 corresponding to the maximum opening position and the minimum opening position of the hand portions 51. The hole member 57 has a plurality of opening position fixing holes 57a in which the pin tip 56c of the opening position fixing pin 56 can be inserted. The plurality of opening position fixing holes 57a are arranged along the moving direction of the opening position adjustment portion 52. The positions of the opening position fixing holes 57a correspond to the plurality of opening positions of the hand portions 51.

Although the hole member 57 of the present embodiment is formed in a planar form that is long along the front-rear direction of the actuator body 21, the hole member 57 may have another form such as a rod form. Moreover, the hole member 57 may not be formed in one sheet of planar form extending in the front-rear direction of the actuator body 21, but may be formed of a plurality of short-length members having one or a plurality of opening position fixing holes 57a.

As illustrated in FIG. 8, when the pin tip 56c is inserted into the opening position fixing hole 57a of the hole member 57 according to downward movement of the opening position fixing pin 56, the flange portion 56d makes contact with the surface of the hole member 57 to restrict the lower position of the opening position fixing pin 56. In this case, a portion of each of the pin bases 56a of the opening position fixing pin 56 remains inserted in each of the pin attachment holes 52a of the opening position adjustment portion 52. Due to this, when the pin tip 56c of the opening position fixing pin 56 is inserted into the opening position fixing hole 57a, the opening position adjustment portion 52 is fixed by the opening position fixing pin 56 so as to be immovable in relation to the actuator body 21.

In FIG. 7, the pin tip 56c of the opening position fixing pin 56 is inserted into a frontmost-side opening position fixing hole 57a of the hole member 57. In this way, the opening position adjustment portion 52 is fixed at the frontmost-side position of the actuator body 21. In this case, the hand portions 51 are fixed at the maximum opening position. On the other hand, in FIG. 9, the pin tip 56c of the opening position fixing pin 56 is inserted into a rearmost-side opening position fixing hole 57a of the hole member 57. In this way, the opening position adjustment portion 52 is fixed at the rearmost-side position of the actuator body 21. In this case, the hand portions 51 are fixed at the minimum opening position. Although not illustrated in the drawing, when the pin tip 56c of the opening position fixing pin 56 is inserted into a position fixing hole 57a other than the two position fixing holes 57a, the hand portions 51 are fixed at an opening position between the maximum opening position and the minimum opening position.

Although the opening position fixing pin 56 of the present embodiment is configured to move downward due to its own weight, there is no limitation to this configuration. The opening position fixing pin 56 may be configured to be always biased toward the hole member 57 by a biasing member (not illustrated) such as a coil spring.

The hole member 57 may be provided so as to be replaceable in relation to the actuator body 21. In this way, by preparing a plurality of hole members 57 in which the number and the positions of the opening position fixing holes 57a are different, it is possible to hold works having various width dimensions using one hand apparatus 1 by replacing the hole member 57 only. When replacement of the hole member 57 is not allowed, the opening position fixing hole 57a may be formed directly in the upper surface of the actuator body 21.

Figure 10:
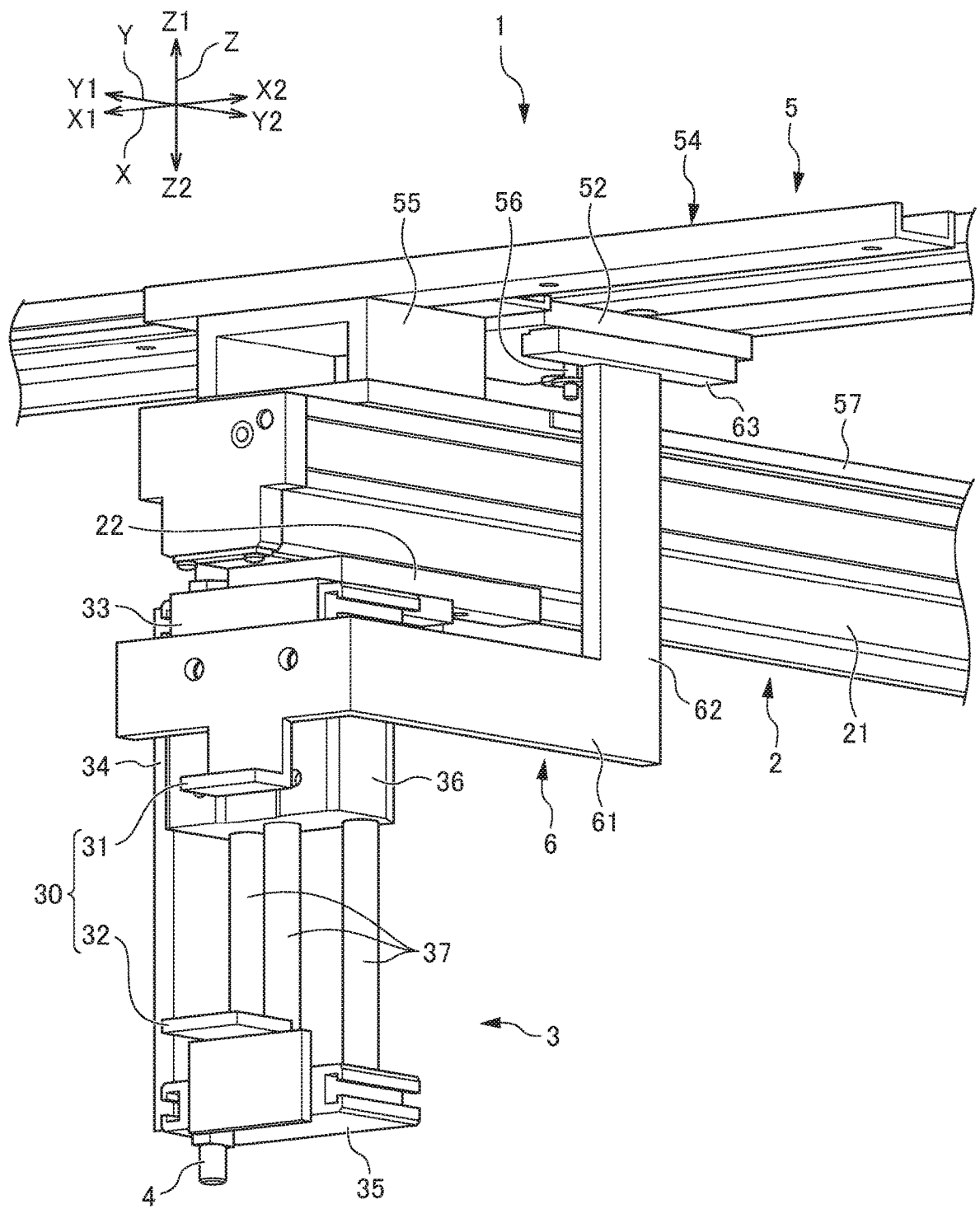
FIG. 10 is a perspective views illustrating a portion of a hand apparatus when a grasper operates at a second position in an enlarged scale.
Figure 11:
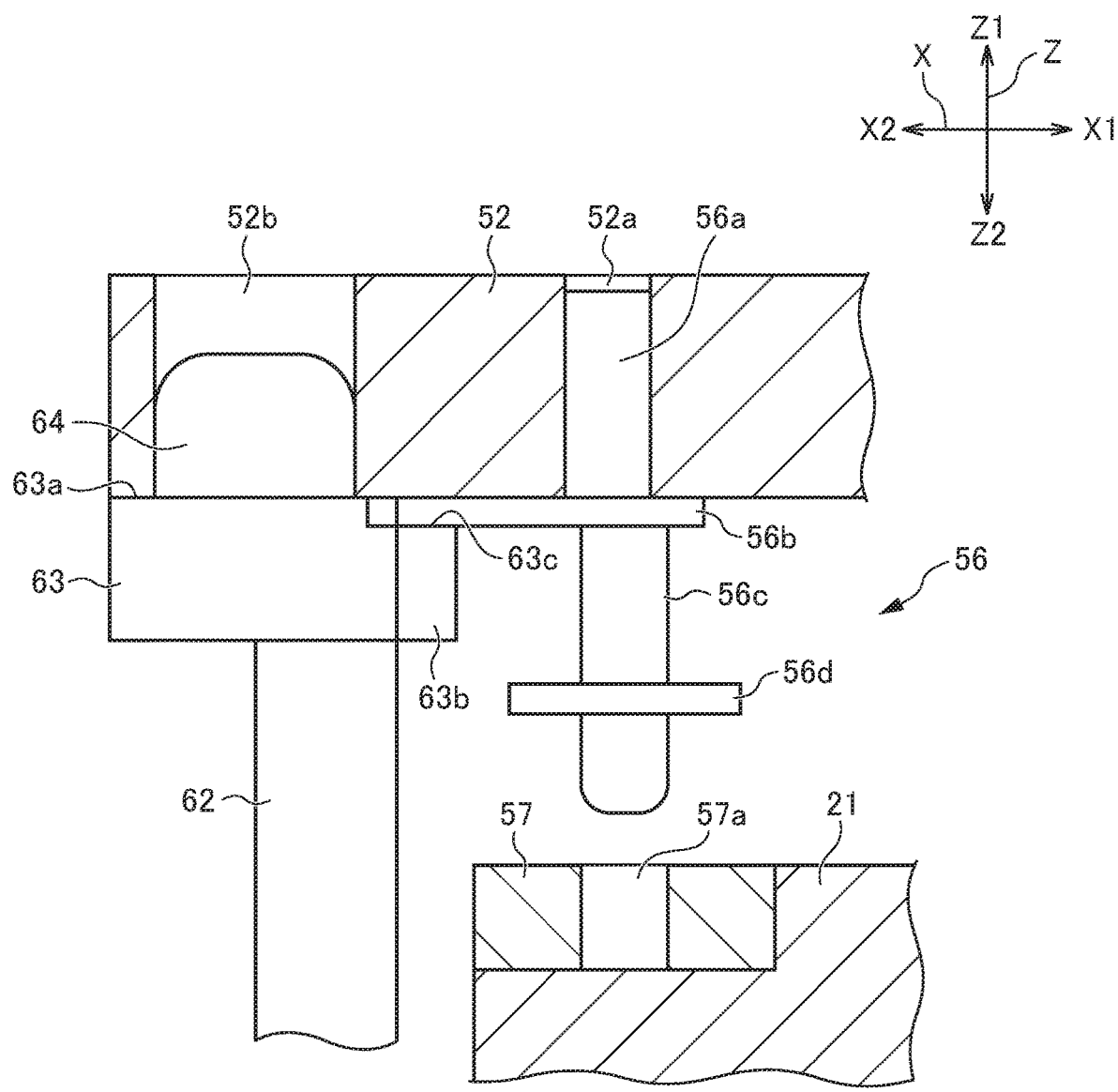
FIG. 11 is a cross-sectional view illustrating an opening position fixing pin and an operating portion when a grasper operates at a second position in an enlarged scale.
Figure 12:
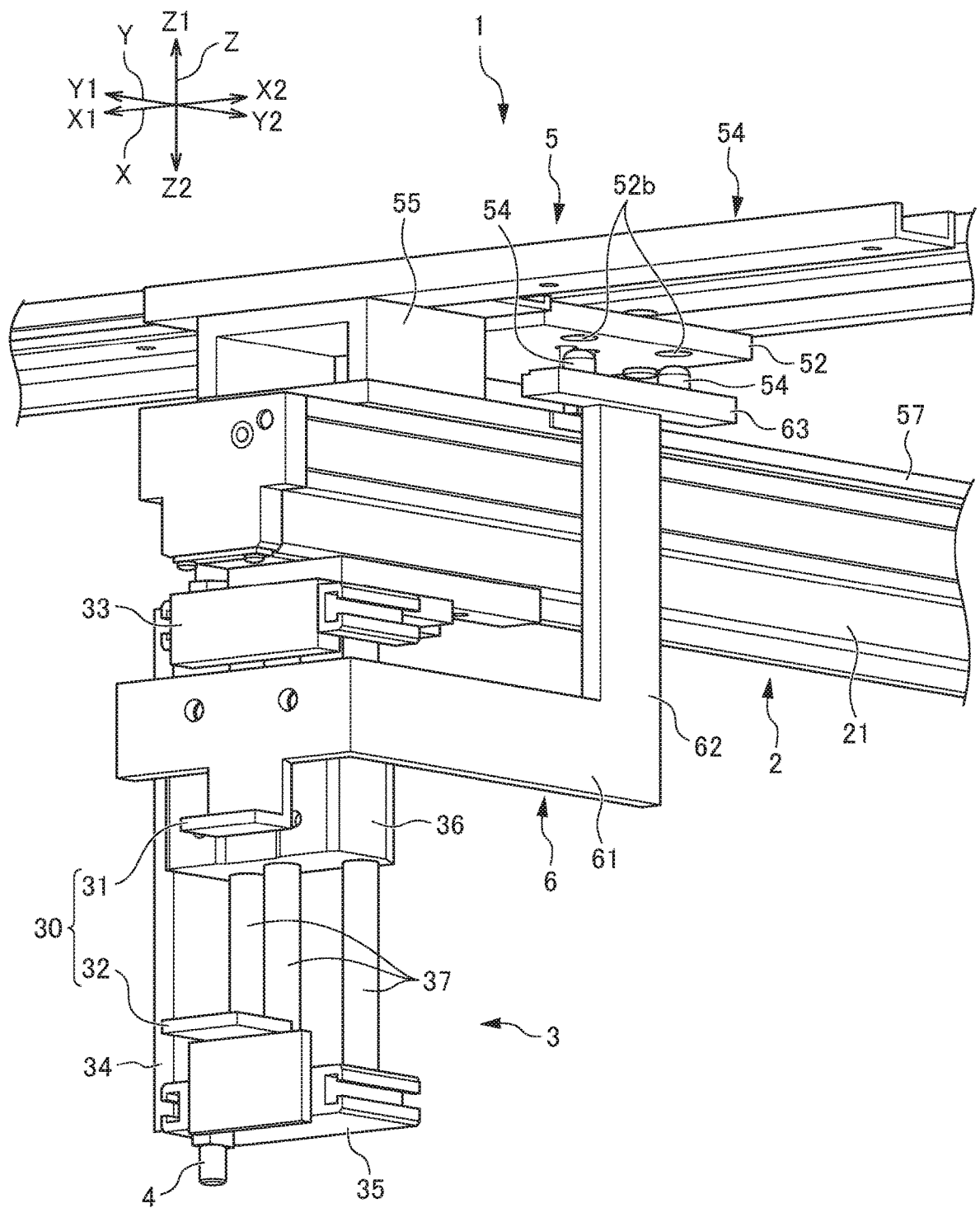
FIG. 12 is a perspective view illustrating a portion of a hand apparatus when a grasper operates at a third position in an enlarged scale.
Figure 13:
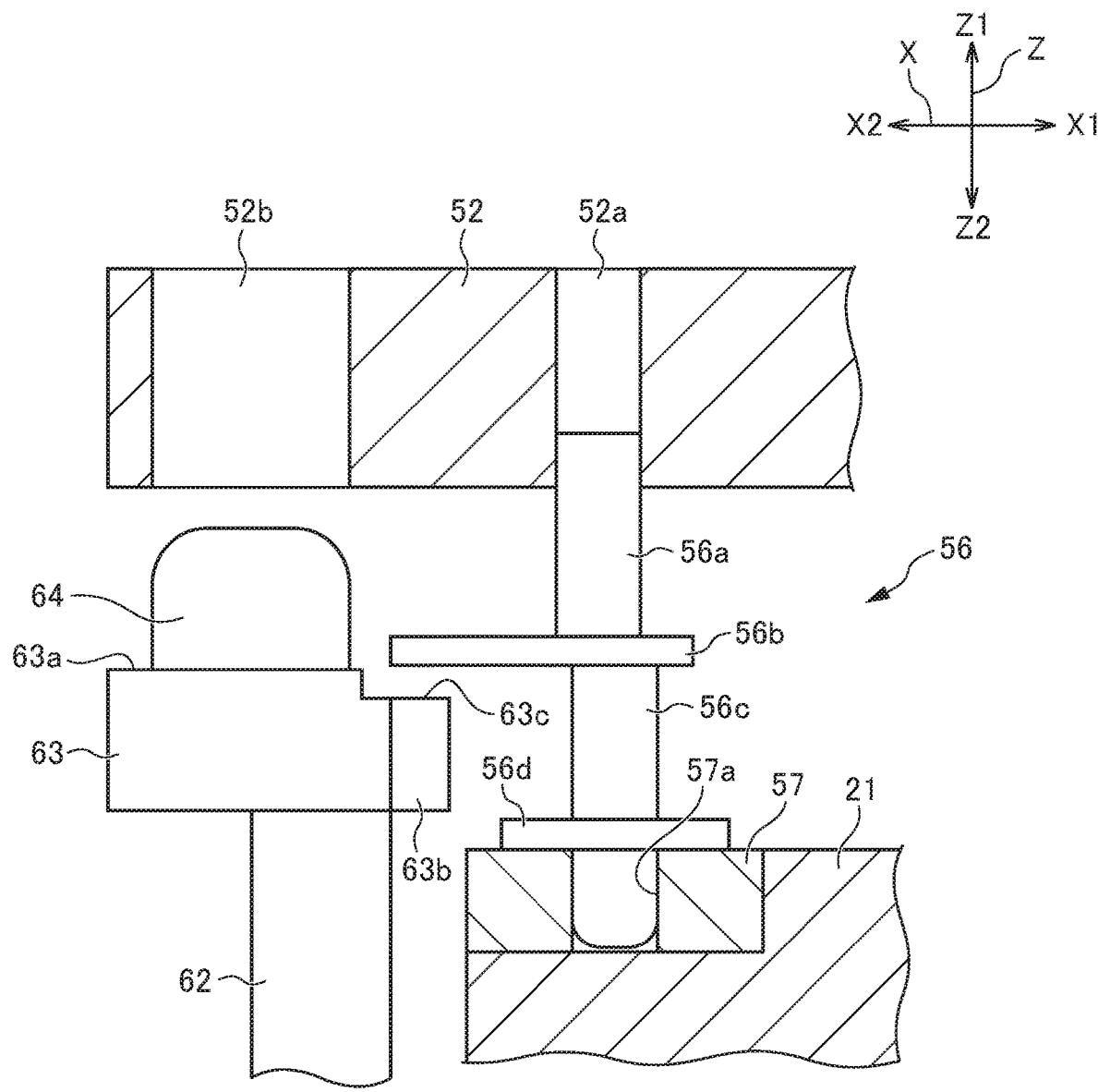
FIG. 13 is a cross-sectional view illustrating an opening position fixing pin and an operating portion when a grasper operates at a third position in an enlarged scale.

Next, a specific configuration of moving the opening position adjustment portion 52 to vary the opening position of the hand portions 51 will be described in detail with reference to FIGS. 10 to 13. FIG. 10 is a perspective view illustrating a portion of a hand apparatus when a grasper operates at a second position in an enlarged scale. FIG. 11 is a cross-sectional view illustrating an opening position fixing pin and an operating portion when a grasper operates at a second position in an enlarged scale. FIG. 12 is a perspective view illustrating a portion of a hand apparatus when a grasper operates at a third position in an enlarged scale. FIG. 13 is a cross-sectional view illustrating an opening position fixing pin and an operating portion when a grasper operates at a third position in an enlarged scale.

An operating portion 6 that is interlocked with the operation of the grasper 3 is attached to the movable member 36 of the grasper 3. The operating portion 6 is disposed on the same lateral side (the X2-direction) as the side where the hole member 57 is disposed in the width direction of the actuator 2. The operating portion 6 includes a first portion 61 fixed to the movable member 36 of the grasper 3 to extend rearward from the movable member 36, a second portion 62 extending upward from the rear end of the first portion 61, and a third portion 63 provided in an upper end of the second portion 62 to serve as a connection portion to the opening position adjustment portion 52. The third portion 63 extends in the front-rear direction of the hand apparatus 1. The upper surface of the third portion 63 is formed in parallel to the lower surface of the opening position adjustment portion 52.

A hole 52b as a first engagement portion is formed in the opening position adjustment portion 52 at a position corresponding to the third portion 63 of the operating portion 6. On the other hand, a convex portion 64 as a second engagement portion that can engage with the hole 52b of the opening position adjustment portion 52 is provided on the upper surface of the third portion 63 of the operating portion 6. The hole 52b is open in the lower surface of the opening position adjustment portion 52. The hole 52b may penetrate through the opening position adjustment portion 52 and may not. Two sets of the holes 52b and the convex portions 64 are provided in parallel in the front-rear direction of the hand apparatus 1.

As illustrated in FIGS. 10 and 13, the pin operating plate 56b of the opening position fixing pin. 56 extends further than the actuator 2 in the lateral side (the X2-direction). Moreover, the third portion 63 of the operating portion 6 has an overhanging portion 63b that can interfere with the pan operating plate 56b by overhanging toward the actuator 2. An upper surface 63c of the overhanging portion 63b is formed to be lower than the upper surface 63a of the third portion 63 having the convex portion 64 by a distance corresponding to the thickness of the pin operating plate 56b.

As illustrated in FIG. 10, when the grasper 3 operates at the second position, the movable member 36 moves toward the uppermost side and the operating portion 6 attached to the movable member 36 moves toward the uppermost side with driving of the grasper driving portion 4. In a course in which the operating portion 6 moves toward the upper side, the upper surface 63c of the overhanging portion 63b of the third portion 63 interferes with the pin operating plate 56b of the opening position fixing pin 56 to lift the pin operating plate 56b upward. Moreover, when the operating portion 6 moves toward the upper side, the third portion 63 of the operating portion 6 makes contact with the lower surface of the opening position adjustment portion 52. In this case, as illustrated in FIG. 11, the convex portion 64 of the operating portion 6 engages with the hole 52b of the opening position adjustment portion 52 by fitting and the opening position adjustment portion. 52 and the operating portion 6 are connected. Moreover, the pin operating plate 56b is sandwiched between the opening position adjustment portion 52 and the overhanging portion 63b of the operating portion 6 whereby the opening position fixing pin 56 is held at a position at which the pin tip 56c is removed from the opening position fixing hole 57a of the hole member 57.

In this way, the opening position adjustment portion 52 can move in a direction along the advancing and retracting directions of the grasper 3 by being interlocked with the advancing and retracting movement of the grasper 3 according to the driving of the actuator 2. When the opening position adjustment portion 52 moves, the position of the pair of hand portions 51 of the hand mechanism portion 5 is varied between the maximum opening position illustrated in FIGS. 3 and 4 and the minimum opening position illustrated in FIGS. 5 and 6 via the link portion 53.

FIGS. 12 and 13 illustrate a state in which the grasper operates at a third position between the first position (see FIG. 1) and the second position (see FIG. 10). At the third position, the third portion 63 of the operating portion 6 is separated downward from the opening position adjustment portion 52 and the connection between the operating portion. 6 and the opening position adjustment portion 52 is disconnected. Moreover, holding of the pin operating plate 56b of the opening position fixing pin 56 by the overhanging portion 63b of the third portion 63 is cancelled and the opening position fixing pin 56 moves downward due to its own weight, whereby the pin tip 56c is inserted into the opening position fixing hole 57a of the hole member 57.

In this way, the opening position adjustment portion 52 is fixed at a position at which the opening position fixing pin 56 is inserted into the opening position fixing hole 57a, and the opening position of the hand portions 51 corresponding to the position of the opening position fixing hole 57a is determined. The fixing position of the opening position adjustment portion 52 (that is, the position of the opening position fixing hole 57a of the hole member 57 in which the opening position fixing pin 56 is inserted) is determined by detecting the position when the grasper 3 (the moving body 22) advances and retracts using a position detector (not illustrated) such as an encoder.

The position of the operating portion. 6 at the third position of the grasper 3 may be between the first position and the second position and is not limited to the position illustrated in FIGS. 12 and 13. When the grasper 3 is at the third position, the connection between the operating portion 6 and the opening position adjustment portion 52 may be disconnected, the holding of the opening position fixing pin 56 by the operating portion. 6 may be cancelled, and the opening position fixing pin 56 may be inserted into the opening position fixing hole 57a. Due to this, the position of the operating portion 6 at the third position of the grasper may be on the lower side than the position illustrated in FIGS. 12 and 13.

Figure 14:
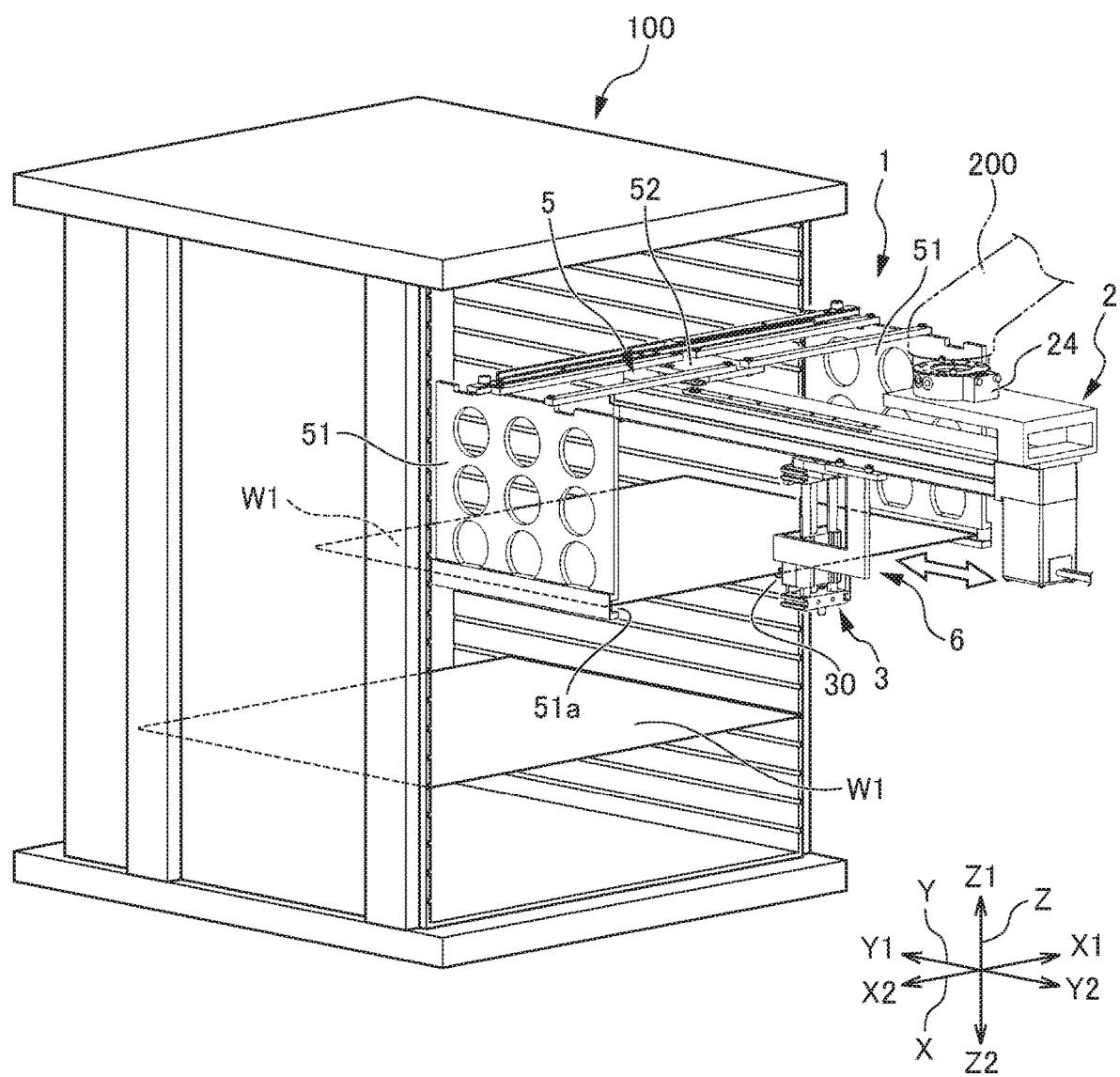
FIG. 14 is a diagram for describing a state in which a work having a relatively large width dimension is held by a hand apparatus.
Figure 15:
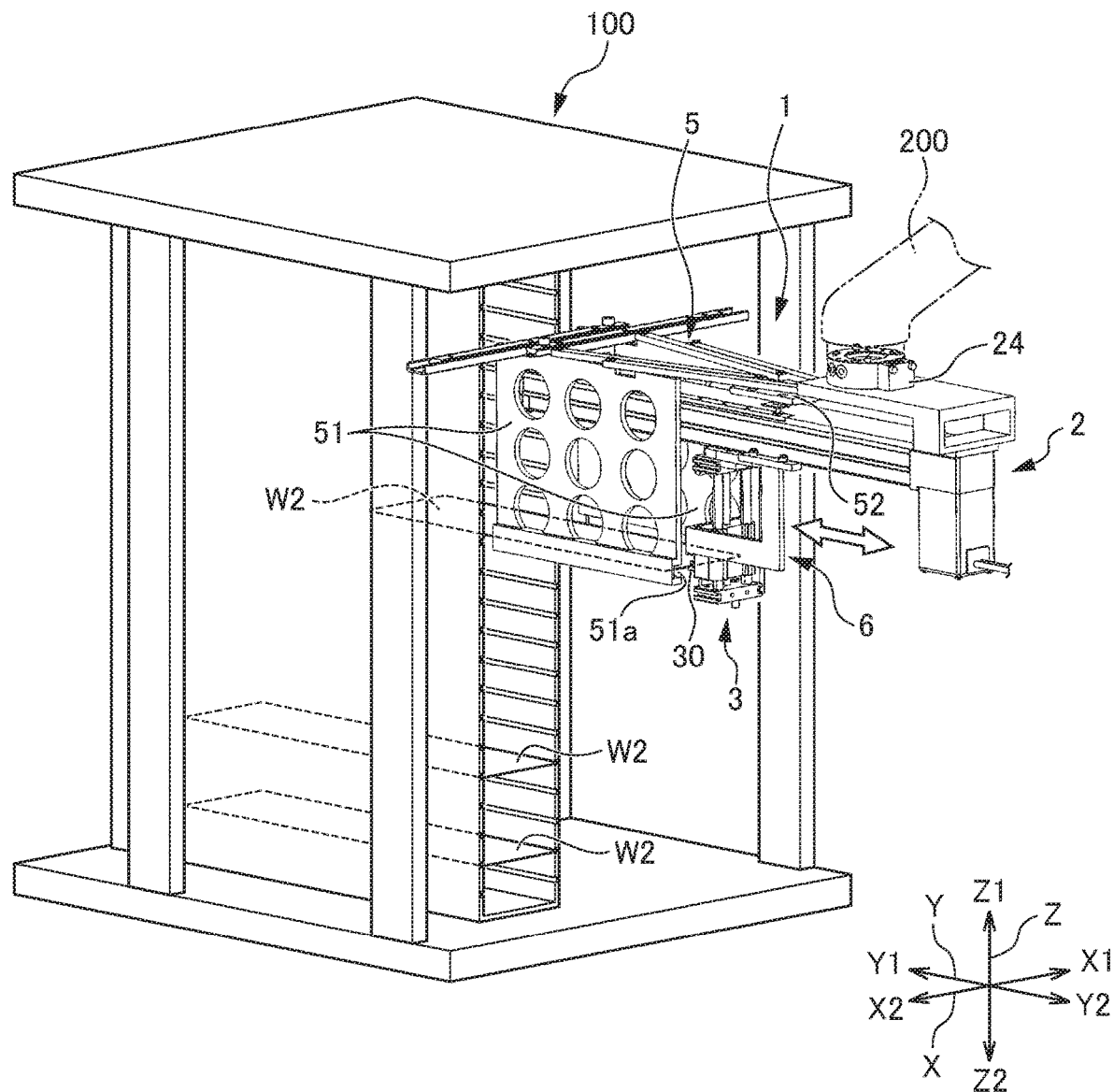
FIG. 15 is a diagram for describing a state in which a work having a relatively small width dimension is held by a hand apparatus.

Next, an example of a work holding operation of the hand apparatus 1 will be described. FIG. 14 is a diagram for describing a state in which a work having a relatively large width dimension is held by a hand apparatus. It is assumed that a width dimension of the work W1 is the largest dimension of a work that can be held by the hand apparatus 1. FIG. 15 is a diagram for describing a state in which a work having a relatively small width dimension is held by a hand apparatus. It is assumed that a width dimension of the work W2 is the smallest dimension of a work that can be held by the hand apparatus 1. As illustrated in FIGS. 14 and 15, a plurality of works W1 and W2 are accommodated in a magazine 100 at intervals in the up-down direction.

As illustrated in FIG. 14, when a work W1 having the largest dimensions that can be held by the hand apparatus 1 is held, first, positioning of the grasper 3 is realized in the front-rear direction with the driving of the actuator 2 so that the third portion 63 of the operating portion 6 is disposed immediately below the opening position adjustment portion 52. After the positioning of the grasper 3 is completed, the movable member 36 of the grasper 3 is moved upward by the grasper driving portion 1 and the grasper 3 operates at the second position (see FIGS. 10 and 11). In this way, the convex portion 64 of the operating portion 6 engages with the hole 52b of the opening position adjustment portion 52 and the operating portion 6 and the opening position adjustment portion 52 are connected.

When the operating portion 6 and the opening position adjustment portion 52 are connected, the opening position fixing pin 56 is held at a position at which the opening position fixing pin 56 is removed from the opening position fixing hole 57a of the hole member 57 by the overhanging portion 63b of the operating portion 6. In this way, the opening position adjustment portion 52 can be moved in the front-rear direction. After that, when the grasper 3 is moved frontward to an extreme extent with the driving of the actuator 2, the opening position adjustment portion 52 is also moved frontward whereby the hand portions 51 are disposed at the maximum opening position (see FIGS. 3 and 4). After that, when the movable member 36 of the grasper 3 is moved downward by the grasper driving portion 4, the grasper 3 operates at the third position (see FIGS. 12 and 13). In this way, the connection between the operating portion 6 and the opening position adjustment portion 52 is disconnected, the opening position fixing pin 56 is moved downward due to its own weight and is inserted into the opening position fixing hole 57a disposed on the frontmost side of the hole member 57. As a result, the opening position adjustment portion 52 is fixed at that position and the hand portions 51 are fixed at the maximum opening position.

After the hand portions 51 are fixed at the maximum opening position, the grasper 3 operating at the third position moves frontward to an extreme extent with the driving of the actuator 2. After that, the hand apparatus 1 moved near the magazine 100 by the operation of the arm 200 of the robot so that the center of the end of the work W1 is disposed between the movable claw 31 and the fixed claw 32. After the hand apparatus 1 is disposed near the magazine 100, when the movable member 36 of the grasper 3 moves downward further by the grasper driving portion 4, the grasper 3 operates at the first position (see FIGS. 1, 2, and 4). In this way, the grasping claw 30 of the grasper 3 grasps the center of the end of the work W1. When the grasper 3 holds the work W1, the grasper 3 moves in a retracting direction and pulls the work W1 out of the magazine 100 with the driving of the actuator 2. Both ends of the work W1 pulled out of the magazine 100 are inserted into and held by the work holding portions 51a of the pair of hand portions 51 fixed at the maximum opening position outside the magazine 100. After that, the hand apparatus 1 moves with the operation of the arm 200 of the arm to convey the work W1.

Subsequently, as illustrated in FIG. 15, when a work W2 having the smallest dimensions that can be held by the hand apparatus 1 is held, after the operating portion 6 and the opening position adjustment portion 52 are connected, the grasper 3 is moved rearward to an extreme extent with the driving of the actuator 2 similarly to the above. In this way, as illustrated in FIGS. 5 and 6, the hand portions 51 are disposed at the minimum opening position. After that, when the movable member 36 of the grasper 3 moves downward by the grasper driving portion 4, the grasper 3 operates at the third position (see FIGS. 12 and 13). In this way, the connection between the operating portion. 6 and the opening position adjustment portion 52 is disconnected, and the opening position fixing pin 56 is moved downward due to its own weight and is inserted into the opening position fixing hole 57a disposed on the rearmost side of the hole member 57. As a result, the opening position adjustment portion. 52 is fixed at that position, and the hand portions 51 are fixed at the minimum opening position.

After the hand portions 51 are fixed at the minimum opening position, the grasper 3 operating at the third position moves frontward to an extreme extent with the driving of the actuator 2. After that, the hand apparatus 1 moves near the magazine 100 by the operation of the arm 200 of the robot so that the center of the end of the work W2 is disposed between the movable claw 31 and the fixed claw 32. After the hand apparatus 1 is disposed near the magazine 100, when the movable member 36 of the grasper 3 is moved further downward by the grasper driving portion 4, the grasper 3 operates at the first position (see FIGS. 1, 2, and 4). In this way, the grasping claw 30 of the grasper 3 grasps the center of the end of the work W2. When the grasper 3 holds the work W2, the grasper 3 is moved in a retracting direction and pulls the work W2 out of the magazine 100 with the driving of the actuator 2. Both ends of the work W2 pulled out of the magazine 100 are inserted into and held by the work holding portions 51a of the pair of hand portions 51 disposed at the minimum opening position outside the magazine 100. After that, the hand apparatus 1 moves with the operation of the arm 200 of the arm to convey the work W2.

As described above, the hand apparatus 1 of the present embodiment includes: the grasper 3 that grasps a work W1 or W2; the grasper driving portion 4 that causes the grasper 3 to operate at a first position at which the grasper grasps the work W1 or W2, a second position at which the grasper 3 is open widest, and a third position between the first position and the second position; a hand mechanism portion 5 having a pair of hand portions 51 that holds both ends in a width direction of the work W1 or W2 grasped by the grasper 3 and capable of varying an opening position of the pair of hand portions 51; an operating portion 6 provided so as to be interlocked with an operation of the grasper 3 and being connectable to the hand mechanism portion 5; and an actuator 2 that causes the grasper 3 to advance and retract, wherein when the grasper 3 is at the second position, the hand mechanism portion 5 is connected to the operating portion 6 to vary the opening position of the pair of hand portions 51 by being interlocked with the advancing and retracting movement of the grasper 3 according to the actuator 2, and when the grasper 3 is at the first position or the third position, the hand mechanism portion 5 is disconnected from the operating portion 6 to fix the opening position of the pair of hand portions 51. Due to this, the hand apparatus 1 does not need to prepare a plurality of hand portions corresponding to the width dimensions of the works W1 and W2 and can hold both ends of various of types of works W1 and W2 having different sizes.

Furthermore, since the actuator 2 that allows the grasper 3 to advance and retract is used as a driving source for varying the opening position of the hand portions 51, it is not necessary to provide a separate driving source. Due to this, it is possible to suppress an increase in the size of the structure of the hand apparatus 1 and to simplify and lighten the hand apparatus 1.

Moreover, the hand mechanism portion 5 includes an opening position adjustment portion 52 provided so as to be movable in a direction along advancing and retracting directions of the grasper 3 and a link portion 53 that causes the pair of hand portions 51 to be open in a width direction of the work W1 or W2 by being interlocked with movement of the opening position adjustment portion 52, the opening position adjustment portion 52 has a hole 52b as a first engagement portion, the operating portion 6 has a convex 64 as a second engagement portion that can engage with the hole 52b, and when the grasper 3 is at the second position, the hole 52b and the convex portion 64 engage with each other whereby the opening position adjustment portion. 52 is connected to the operating portion 6 to move by being interlocked with the advancing and retracting movement of the grasper 3 by the actuator 2, and when the grasper 3 is at the first position or the third position, the hole 52b and the convex portion 64 are disengaged from each other whereby the opening position adjustment portion 52 is disconnected from the operating portion 6 to fix the opening position of the pair of hand portions 51. Due to this, the hand apparatus 1 can easily vary the opening position of the pair of hand portions 51 with the aid of the link portion. 53 by connecting the opening position adjustment portion 52 and the operating portion 6. The hand apparatus 1 can easily fix the opening position of the pair of hand portions 51 when the connection between the opening position adjustment portion 52 and the operating portion 6 is disconnected.

In the hand apparatus 1, the first engagement portion may be configured a convex portion, and the second engagement portion may be configured as a hole. Moreover, a specific configuration of the first engagement portion and the second engagement portion is not limited to a hole and a convex portion as long as the first and second engagement portions can engage with each other and allow the opening position adjustment portion 52 to advance and retract in the front-rear direction when the grasper 3 advances and retracts in the front-rear direction in a state in which the first and second engagement portions are in an engagement state.

Furthermore, the actuator 2 has a plurality of opening position fixing holes 57a arranged so as to correspond to a plurality of opening positions of the pair of hand portions 51 along a moving direction of the opening position adjustment portion 52, the opening position adjustment portion 52 has an opening position fixing pin 56 that can advance toward and retract away from the opening position fixing hole 57a, when the grasper 3 is at the second position, the opening position fixing pin 56 is configured to be held at a position at which the opening position fixing pin 56 is removed from the opening position fixing hole 57a according to the operating portion 6, and when the grasper 3 is at the first position or the third position, the holding by the operating portion 6 is cancelled, and the opening position fixing pin 56 is inserted into any one of the opening position fixing holes 57a. Due to this, the hand apparatus 1 can easily fix the opening position adjustment portion 52 just by disconnecting the opening position adjustment portion. 52 and the operating portion 6 from each other.

EXPLANATION OF REFERENCE NUMERALS

1: Hand apparatus
2: Actuator
3: Grasper
4: Grasper driving portion
5: Hand mechanism portion
51: Hand portion
52: Opening position adjustment portion
52b: Hole (first engagement portion)
53: Link portion
56: Opening position fixing pin
57: Hole member
57a: Opening position fixing hole
6: Operating portion
64: Convex portion (second engagement portion)
W1, W2: Work

What is claimed is:

1. A hand apparatus comprising: a grasper that grasps a work;
   a grasper driving portion that causes the grasper to operate at a first position at which the grasper grasps the work, a second position at which the grasper is open widest, and a third position between the first position and the second position;
   a hand mechanism portion having a pair of hand portions that holds both ends in a width direction of the work grasped by the grasper and capable of varying an opening position of the pair of hand portions;

an operating portion provided so as to be interlocked with an operation of the grasper and being connectable to the hand mechanism portion; and an actuator that causes the grasper to advance and retract, wherein when the grasper is at the second position, the hand mechanism portion is connected to the operating portion to vary the opening position of the pair of hand portions by being interlocked with the advancing and retracting movement of the grasper according to the actuator, and when the grasper is at the first position or the third position, the hand mechanism portion is disconnected from the operating portion to fix the opening position of the pair of hand portions.

2. The hand apparatus according to claim 1, wherein the hand mechanism portion includes an opening position adjustment portion provided so as to be movable in a direction along advancing and retracting directions of the grasper and a link portion that causes the pair of hand portions to be open in a width direction of the work by being interlocked with movement of the opening position adjustment portion, the opening position adjustment portion has a first engagement portion, the operating portion has a second engagement portion that can engage with the first engagement portion, and when the grasper is at the second position, the first engagement portion and the second engagement portion engage with each other whereby the opening position adjustment, portion is connected to the operating portion to move by being interlocked with the advancing and retracting movement of the grasper by the actuator, and when the grasper is at the first position or the third position, the first engagement portion and the second engagement portion are disengaged from each other whereby the opening position adjustment portion is disconnected from the operating portion to fix the opening position of the pair of hand portions.

3. The hand apparatus according to claim 2, wherein the actuator has a plurality of opening position fixing holes arranged so as to correspond to a plurality of opening positions of the pair of hand portions along a moving direction of the opening position adjustment portion, the opening position adjustment portion has an opening position fixing pin that can advance toward and retract away from the opening position fixing hole, when the grasper is at the second position, the opening position fixing pin is configured to be held at a position at which the opening position fixing pin is removed from the opening position fixing hole according to the operating portion, and when the grasper is at the first position or the third position, the holding by the operating portion is cancelled, and the opening position fixing pin is inserted into any one of the opening position fixing holes.

4. The hand apparatus according to claim 3, wherein the opening position fixing hole is formed in a hole member provided in the actuator, and the hole member is provided to be replaceable in the actuator.

5. The hand apparatus according to claim 1, wherein the grasper driving portion is configured as a three-position cylinder that allows the grasper to operate at any one of the first position, the second position, and the third position.

* * * * *